(12) United States Patent
Chi (10) Patent No.: US 7,810,773 B2
(45) Date of Patent: Oct. 12, 2010

(54) SUPPORT ARM STRUCTURE WITH ELASTIC FORCE ADJUSTMENT ARRANGEMENT

(76) Inventor: Ching-Chih Chi, No. 310, Cyuansing Road, Taishan, Taipei (TW)

( * ) Notice: Subject to any disclaimer, the term of this patent is extended or adjusted under 35 U.S.C. 154(b) by 148 days.

(21) Appl. No.: 12/177,265

(22) Filed: Jul. 22, 2008

(65) Prior Publication Data

US 2010/0019112 A1 Jan. 28, 2010

(51) Int. Cl.
*E04G 3/00* (2006.01)

(52) U.S. Cl. ............... 248/278.1; 361/679.01; 361/679.02; 361/679.06; 361/679.21; 248/122.1; 248/121; 248/917; 248/919; 248/921; 248/922; 248/280.11; 248/284.1; 248/276.1; 248/274.1; 248/281.11; 248/282.1; 248/558; 248/125.1; 248/125.2; 248/125.7; 248/125.8; 248/923; 248/920; 248/592; 248/594

(58) Field of Classification Search ............. 248/122.1, 248/121, 917, 919, 921, 922, 280.11, 284.1, 248/276.1, 274.1, 278.1, 281.11, 282.1, 558, 248/125.1, 125.2, 125.7, 125.8, 920, 923, 248/592, 594; 361/679.21, 679.01, 679.02, 361/679.06
See application file for complete search history.

(56) References Cited

U.S. PATENT DOCUMENTS

| 5,799,917 | A  | * | 9/1998  | Li ............................ 248/284.1 |
| 6,478,275 | B1 | * | 11/2002 | Huang ...................... 248/284.1 |
| 6,592,090 | B1 | * | 7/2003  | Li ............................ 248/284.1 |
| 6,769,657 | B1 | * | 8/2004  | Huang ...................... 248/278.1 |
| 7,252,277 | B2 | * | 8/2007  | Sweere et al. ............... 248/371 |
| 7,510,155 | B2 | * | 3/2009  | Huang et al. ............. 248/278.1 |
| 7,726,616 | B2 | * | 6/2010  | Zhang et al. ............. 248/284.1 |

* cited by examiner

*Primary Examiner*—J. Allen Shriver, II
*Assistant Examiner*—Nkeisha J Smith (57) ABSTRACT

A pivotal support arm structure has an elastic force adjustment arrangement in order to accommodate the various loads. One end of the support arm structure may be secured to the edge of a desk and the other end thereof may be secured to an article (e.g., LCD display) to be held in use.

4 Claims, 12 Drawing Sheets

SUPPORT ARM STRUCTURE WITH ELASTIC FORCE ADJUSTMENT ARRANGEMENT

BACKGROUND OF THE INVENTION

1. Field of Invention

The invention relates to support arms and more particularly to an improved pivotal support arm structure having an elastic force adjustment arrangement in order to accommodate the various loads when one end of the support arm structure is secured to the edge of a desk and the other end thereof secured to an article (e.g., LCD (liquid crystal display) display).

2. Description of Related Art

Mounts, stands, and supports for articles (e.g., LCD (liquid crystal display) display, computer monitor, television (TV), notebook computer, keyboard, mouse, telephone, mobile phone, or the like) are well known in the art. However, such prior devices are typically relatively complex in constructions, trouble-prone, troublesome to manipulate or operate, and impossible of adjusting its spring force. Thus, the need for improvement still exists.

SUMMARY OF THE INVENTION

It is therefore one object of the invention to provide a pivotal support arm structure having an elastic force adjustment arrangement in order to accommodate the various loads when one end of the support arm structure is secured to the edge of a desk and the other end thereof secured to an article.

The above and other objects, features and advantages of the invention will become apparent from the following detailed description taken with the accompanying drawings.

DETAILED DESCRIPTION OF THE INVENTION

Referring to FIGS. 1 to 29, a support arm structure in accordance with the invention comprises the following components as discussed in detail below.

An outer assembly 1, an inner assembly 3, and a seating member 2 on the tops of both the outer assembly 1 and the inner assembly 3 are provided. A cylindrical spacer member 5 is provided between the lower ends of the outer assembly 1. A seat member 6 is provided on the lower ends of the outer assembly 1. An upper guide member 46 is provided on the upper portion of the outer assembly 1. A lower guide member 48 is provided on the lower portion of the inner assembly 3. A bolt 49 is driven through a top through hole 47 of the upper guide member 46, a nut 45, and a fastening plate 43 to threadedly secure them together. The fastening plate 43 is seated upon a tube 40 with a helical spring 42 put thereon. A lower portion of the tube 40 is inserted into an axial hole 481 of the lower guide member 48. A tool (e.g., screw driver) may be inserted into a top hole 25 of the seating member 2 to manipulate the bolt 49 so as to adjust the compression extent of the spring 42 (see FIG. 23).

The outer assembly 1 has a section of U and comprises a main member 11 having a longitudinal opening 12 on one side, the opening 12 having a toothed mouth, the main member 11 having two opposite extensions 13 on the bottom, a central hole 14 through either extension 13, two opposite arcuate grooves 15 on the extension 13 with the hole 14 disposed therebetween, two opposite risers 16 on the top, and a hole 17 through either riser 16. Two rectangular recesses 111 are provided on two opposite sides of the main member 11 for increasing the structural strength. Alternatively, an extension portion 151 can be formed at one end of the groove 15 for permitting a further angular movement of a second pin 19 (see FIG. 29).

The inner assembly 3 is a section of U and comprises a U-shaped main section 31 having a longitudinal opening 32 on one side, the main section 31 being received in the main member 11, the main section 31 having two opposite lower yoke arms 33 on the bottom, a lower hole 34 through either lower yoke arm 33, two opposite upper yoke arms 35 on the top, and a hole 36 through either upper yoke arm 35. The inner assembly 3 is fitted in the outer assembly 1. A distance between the hole 36 and the hole 34 on the same side is the same as that between the hole 16 and the hole 14 on the same side. Two lower threaded holes 38 are provided on the main section 31 proximate the lower yoke arms 33.

The seating member 2 comprises a main section 28 including an inner surface 29, an outer surface 21, and a top surface 22; and two surfaces 23 on both sides of the main section 28. Either side surface 23 has an upper hole 26 and a lower hole 27. Further, a hole 25 is provided on the top surface 22 and four holes 24 arranged in a square are provided on the outer surface 21.

The cylindrical spacer member 5 is provided between the extensions 13 and comprises a central, axial through hole 51 and two opposite through holes 52 aligned with the through hole 51.

The spring assembly 4 comprises the fastening plate 43, the nut 45, the bolt 49, the upper guide member 46, the lower guide member 48, the tube 40, and the spring 42.

The upper guide member 46 is shaped as an inverted L and is provided on the upper portion of the main member 11 of the outer assembly 1. The upper guide member 46 comprises a longitudinal wall 461 and a top surface 462 having a through hole 47. In this embodiment, the upper guide member 46 is secured to the main member 11 by soldering (see FIG. 3).

The lower guide member 48 is provided on the lower portion of the main section 31 of the inner assembly 3. The lower guide member 48 has an axial hole 481 of oval, two threaded holes 482 on the outer surface, and two side surfaces 483. Two fasteners (e.g., screws) 39 are driven through the threaded holes 38 into the threaded holes 482 to fasten the lower guide member 48 in the main section 31.

The tube 40 has a latched annular member 41 on the top end. The tube 40 has a lower portion inserted into the axial hole 481 of the lower guide member 48.

The spring 42 put on the tube 40 is adapted to exert a downward expansion force on the lower guide member 48. The spring 42 can be replaced with a different one depending on different load requirements (e.g., 1.5 kg to 6 kg, 3 kg to 8.5 kg, or 5 kg to 15 kg).

The fastening plate 43 is provided in the upper portion of the main section 31 of the inner assembly 3. The fastening plate 43 is shaped as a square and has a lower extension 431 and a longitudinal threaded hole 44 through itself and the extension 431. The bottom of the fastening plate 43 is resiliently seated upon the slotted annular member 41 with the extension 431 surrounded by the slotted annular member 41.

The bolt 49 is driven through the top through hole 47 of the upper guide member 46, the nut 45, and the threaded hole 44 of the fastening plate 43 to threadedly secure them together. The nut 45 has an upper extension and an axial threaded hole 452. Also, the nut 45 is biased between the top surface 462 of the upper guide member 46 and the fastening plate 43. Note that the bolt 49 and the nut 45 are corotated. The diameter of the through hole 47 is sufficiently larger than that of the shank of the bolt 49. Hence, the bolt 49 is adapted to rotate about the through hole 47. The fastening plate 43 may move upward or downward in response to the turning of the bolt 49 since the fastening plate 43 is retained in the main section 31. And in turn, the tube 40 may lift or lower. As a result, the spring 42 may be either compressed to urge against the lower guide member 48 when the tube 40 lowers or loosened to decrease its elastic force exerted upon the lower guide member 48 when the tube 40 lifts. In short, a rotational turning of the bolt 49 can adjust the compression extent of the spring 42 so as to accommodate different load requirements (e.g., LCD (liquid crystal display) display, computer monitor, television (TV), notebook computer, keyboard, mouse, telephone, mobile phone, or the like).

A seat member 6 comprises a longitudinal hollow cylinder 62 and a lateral yoke 61. On either yoke 61 there are provided a plate 65, an intermediate hole 63, and upper and lower holes 64 aligned with the hole 63 in an oblique manner. A yoke member 60 comprises a bottom member 66 and two side yoke arms 67 each having an intermediate hole 68 and upper and lower holes 69 aligned with the hole 63 in an oblique manner. The yoke member 60 is fitted around the extensions 13.

A first pivot pin 10 is provided through the holes 63, 68, 14 and the through hole 51, a second pin 19 is inserted through the upper hole 64 on one plate 65, the upper hole 69 on one yoke arm 67, one arcuate groove 15 on one extension 13, one through hole 52, one arcuate groove 15 on the other extension 13, the upper hole 64 on the other plate 65, and the upper hole 69 on the other yoke arm 67, and a first pin 18 is inserted through the lower hole 64 on one plate 65, the lower hole 69 on one yoke arm 67, the other arcuate groove 15 on one extension 13, the other through hole 52, the other arcuate groove 15 on the other extension 13, the lower hole 64 on the other plate 65, and the lower hole 69 on the other yoke arm 67 to assemble the seat member 6, the yoke member 60, the spacer member 5, and the outer assembly 1 together. As a result, the spring assembly 4 is assembled.

Moreover, a second pivot pin 20 is inserted through the holes 17, 26, and a fourth pin 30 is inserted through the holes 35, 27 to assemble the seating member 2, the outer assembly 1, and the inner assembly 3 together.

Figure 9:
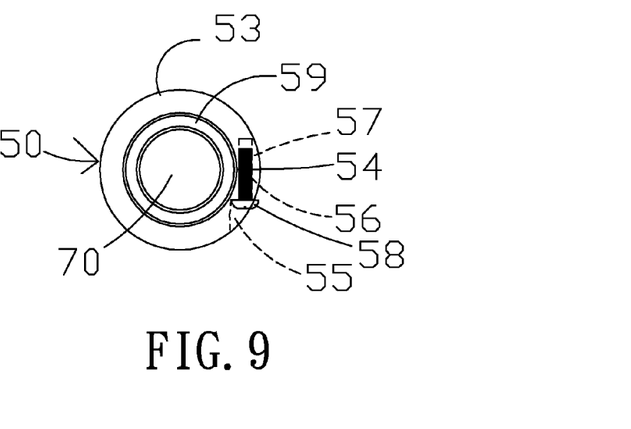
FIG. 9 is a top plan view of FIG. 8 with the seat member and the lower portion of the clamp removed.
Figure 10:
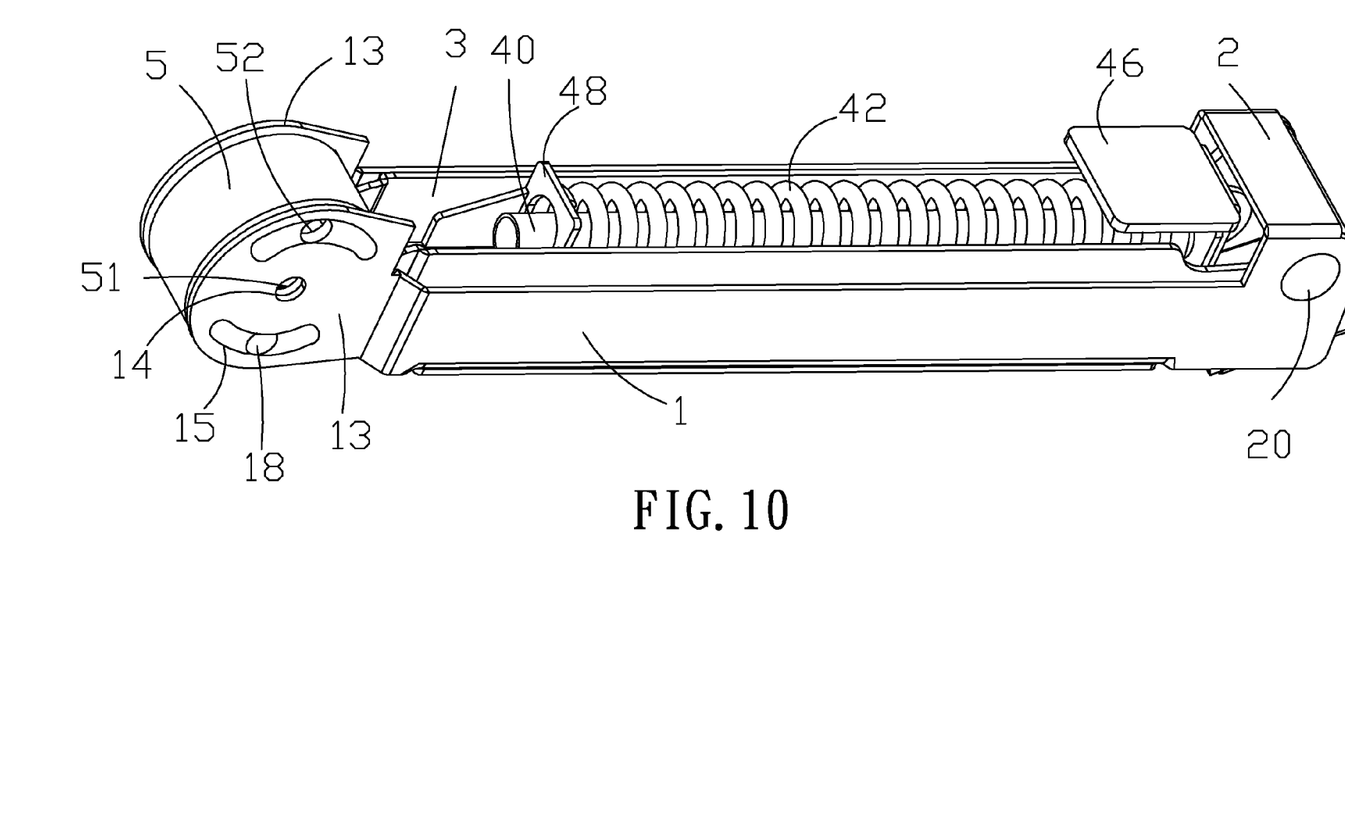
FIG. 10 is a perspective view of the support arm structure of FIG. 1.
Figure 11:
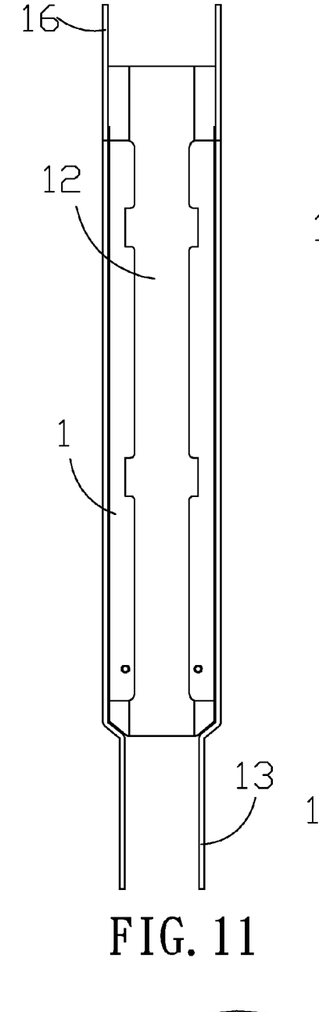
FIGS. 11, 12, 13 and 14 are front view, side elevation, rear view, and bottom view of the outer assembly respectively.
Figures 12, 13:
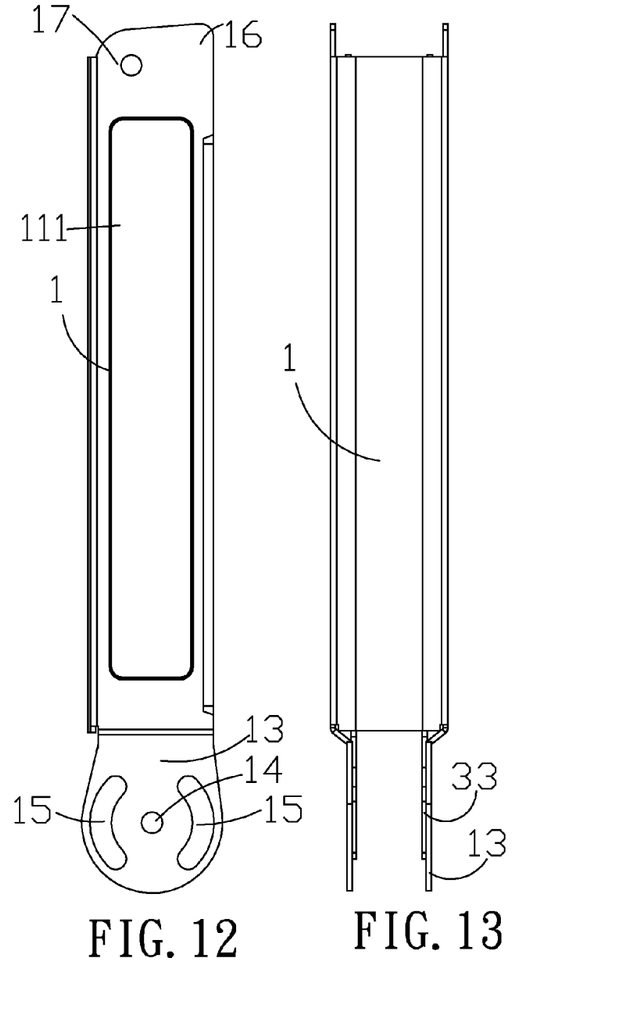
Figure 14:
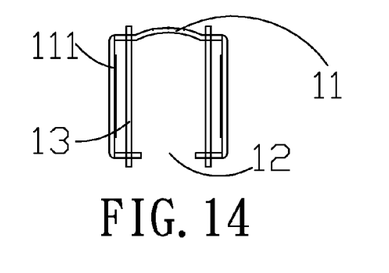
Figure 15:
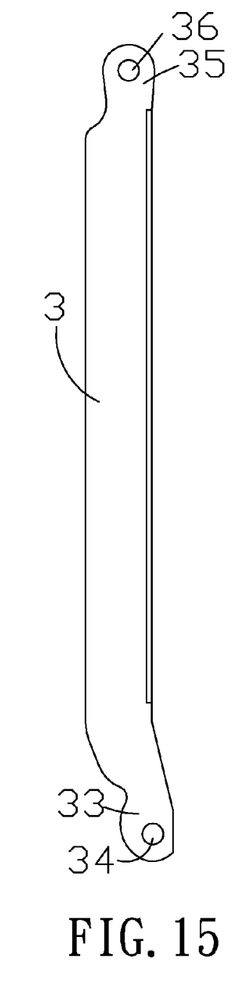
FIGS. 15 and 16 are front view and side elevation of the inner assembly respectively.
Figure 16:
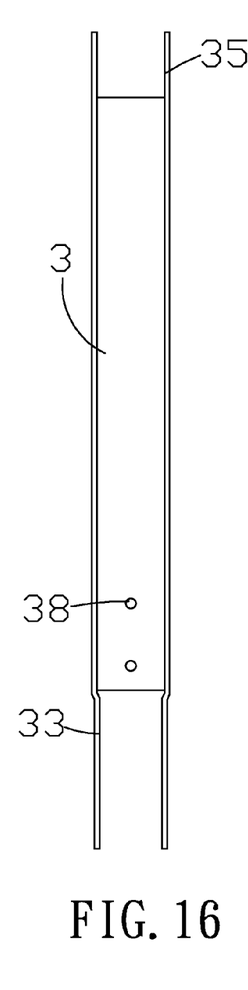
Figure 17:
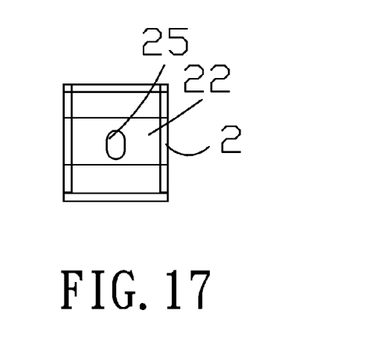
FIGS. 17, 18 and 19 are top views, side elevation, and front view of the seating member respectively.
Figure 18:
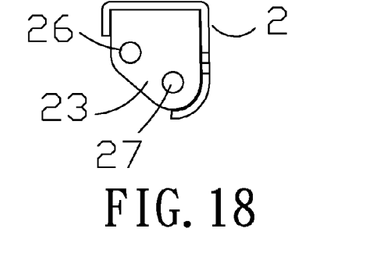
Figure 19:
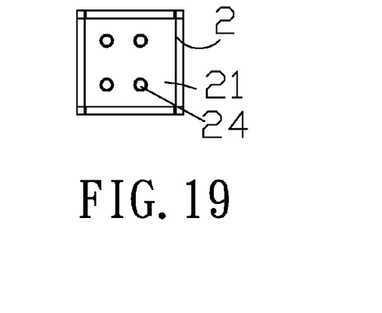
Figures 20, 21:
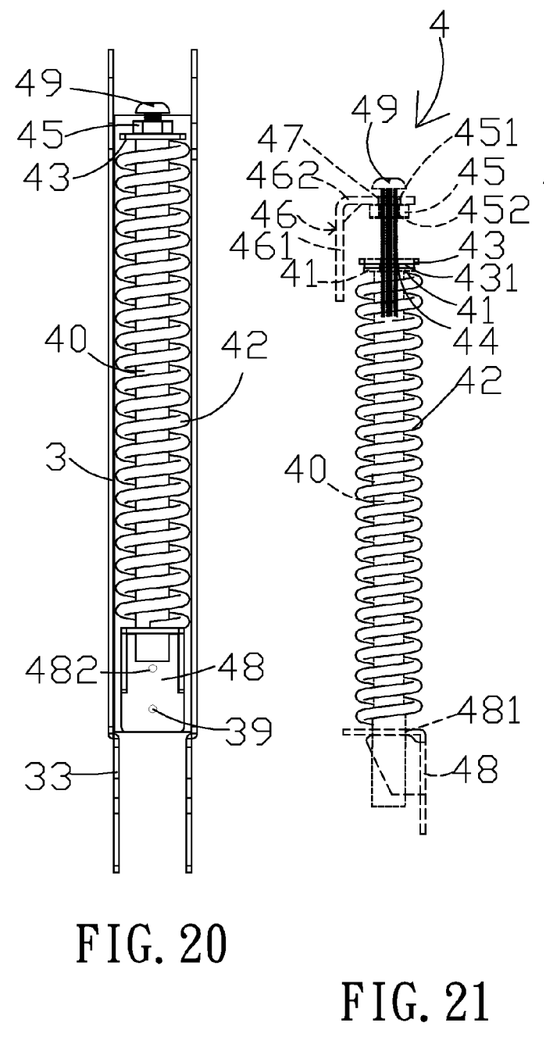
FIG. 20 is a front view of the inner assembly with the tube, the spring, and other components disposed therein and the outer assembly removed.
FIGS. 21 and 22 are side elevations showing the spring before compression and after compression respectively.
Figure 22:
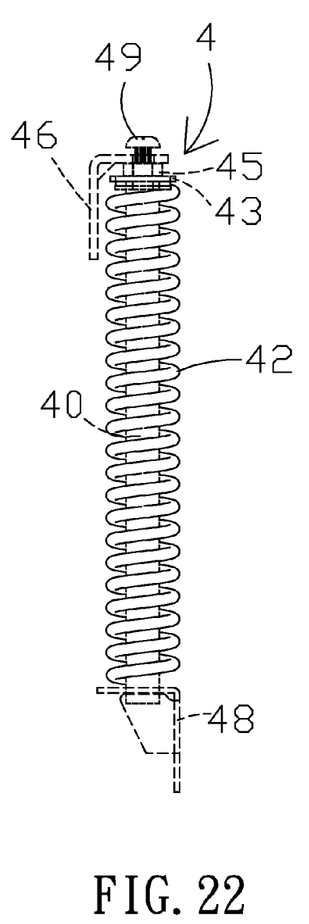
Figure 23:
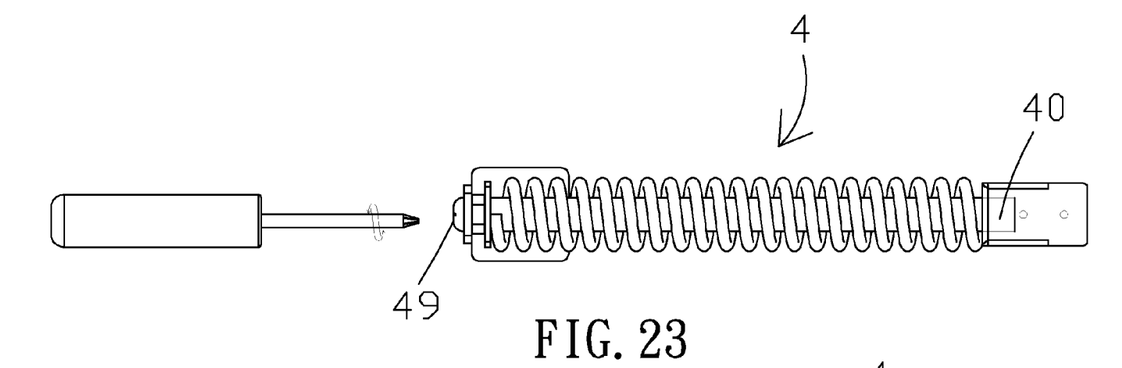
FIGS. 23 and 24 are side elevations showing the spring before adjustment and after adjustment respectively.
Figure 24:
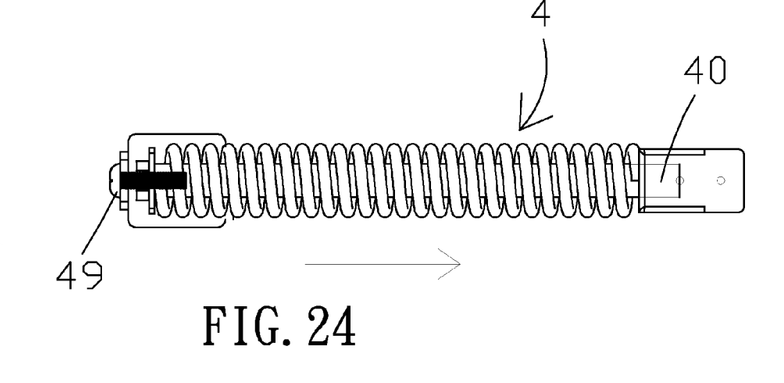

As shown in FIG. 9, a quick release 50 comprises a C-shaped member 53 having a recess 55 and a threaded hole 56 at one end, and a threaded hole 57 at the other end opposing the threaded hole 56; and a gap 54 between the both ends of the C-shaped member 53.

Figure 8:
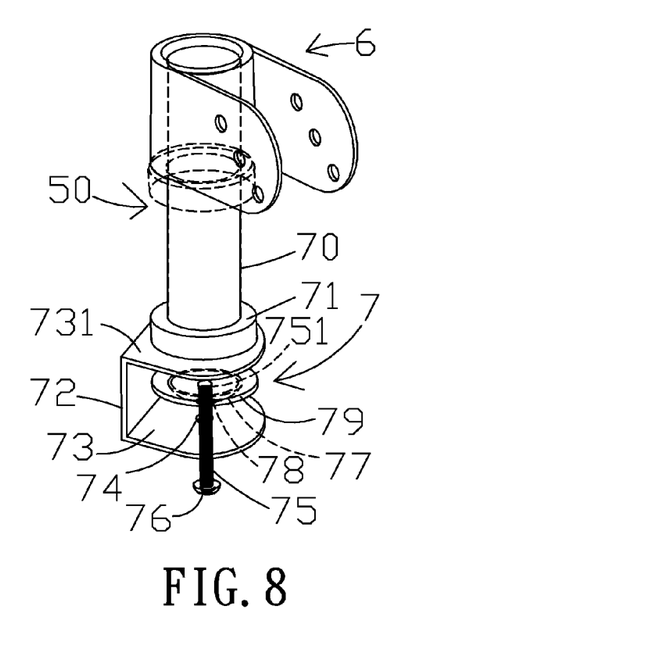
FIG. 8 is a perspective view of the clamp and the quick release.

As shown in FIGS. 8 and 9, a clamp 7 comprises a top cylinder 70 inserted through the C-shaped member 53. Next, a truncated cone-shaped bushing member 59 is fitted between the cylinder 70 and the C-shaped member 53. A screw 58 is driven through the threaded holes 56, 57 to tighten the C-shaped member 53 around the bushing member 59 which in turn tightens the cylinder 70. Hence, the seat member 6 and the cylinder 70 are assembled together. It is thus possible of adjusting the relative position of the seat member 6 and the clamp 7 (i.e., height of the spring assembly 4) by manipulating the quick release 50.

Figure 7:
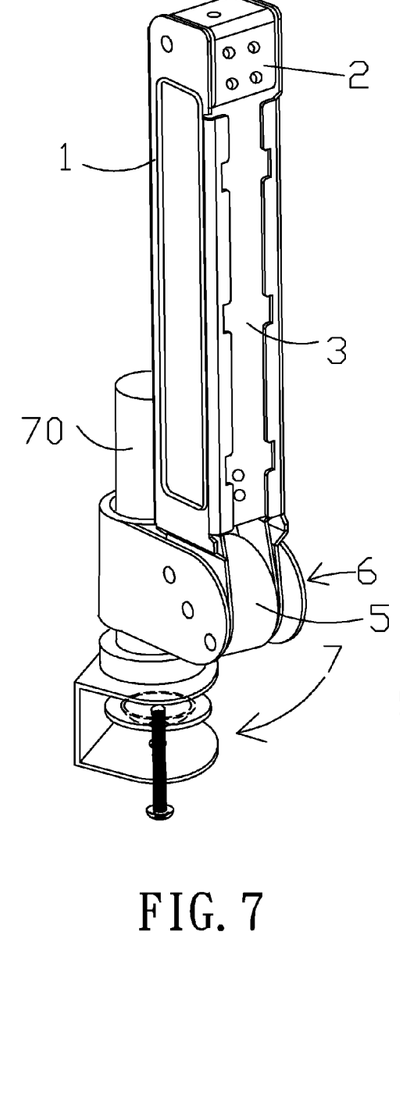
FIG. 7 is a perspective view of the support arm structure secured to a clamp in an offset manner and the clamp is mounted on an edge of a desk.

As shown in FIG. 7, the clamp 7 is a C-clamp and comprises a frame 72, a ring 71 on the top surface 731 of the frame 72 with the cylinder 70 being fastened through, a hole 74 through the bottom surface 73 of the frame 72, a bolt 75 driven through the hole 74 and having a slotted head 76 and a flat end 751, a moveable jaw 77 having a bottom cavity 78 with the head 76 secured therein, and a fastening plate 79 provided on the top of the moveable jaw 77. It is understood that an individual may put the empty portion between the top surface 731 of the frame 72 and the fastening plate 79 on the edge of a desk and then tighten the bolt 75 to upward move the moveable jaw 77 until the desk edge and the clamp 7 are secured together.

Figure 1:
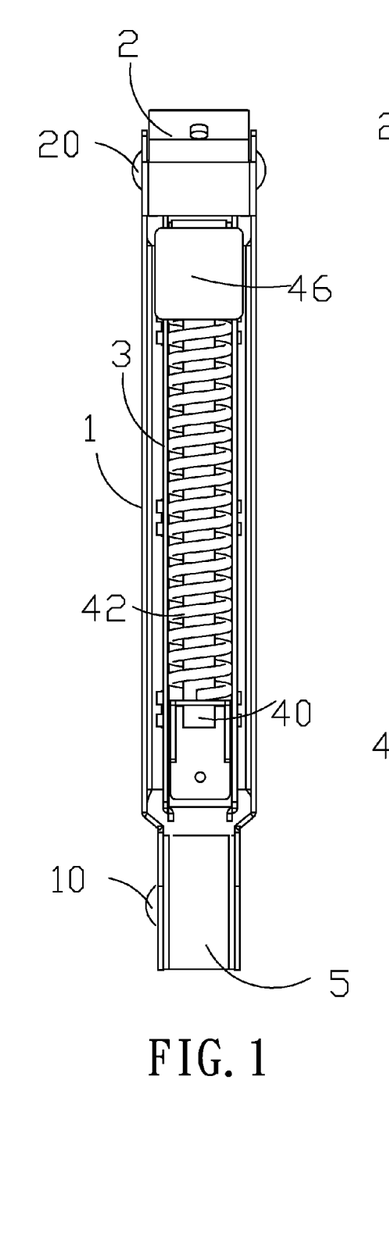
FIG. 1 is a front view of a support arm structure according to the invention.
Figure 2:
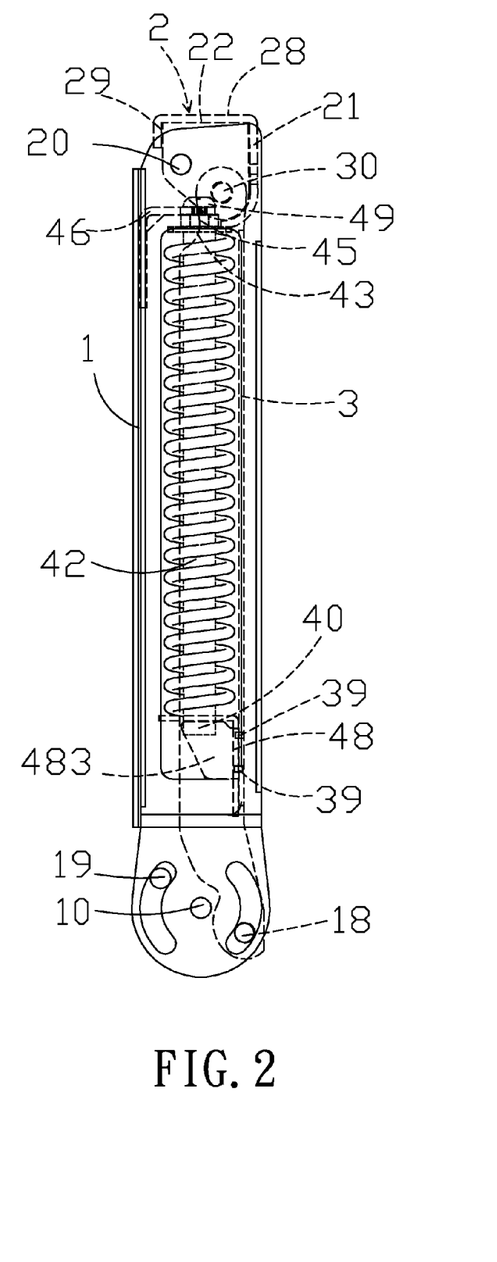
FIG. 2 is a side elevation of the support arm structure of FIG. 1.
Figure 3:
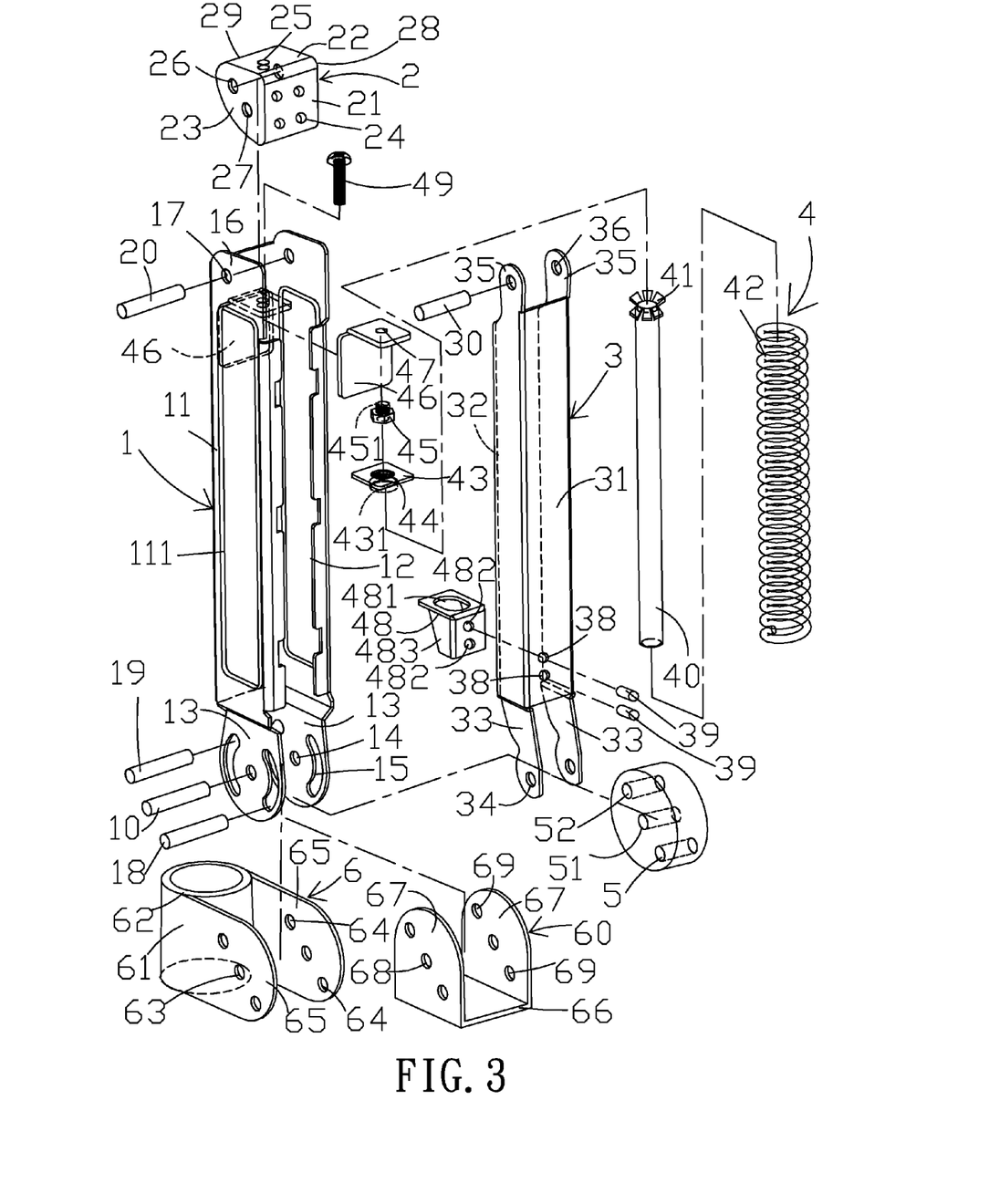
FIG. 3 is an exploded view of the support arm structure.
Figure 4:
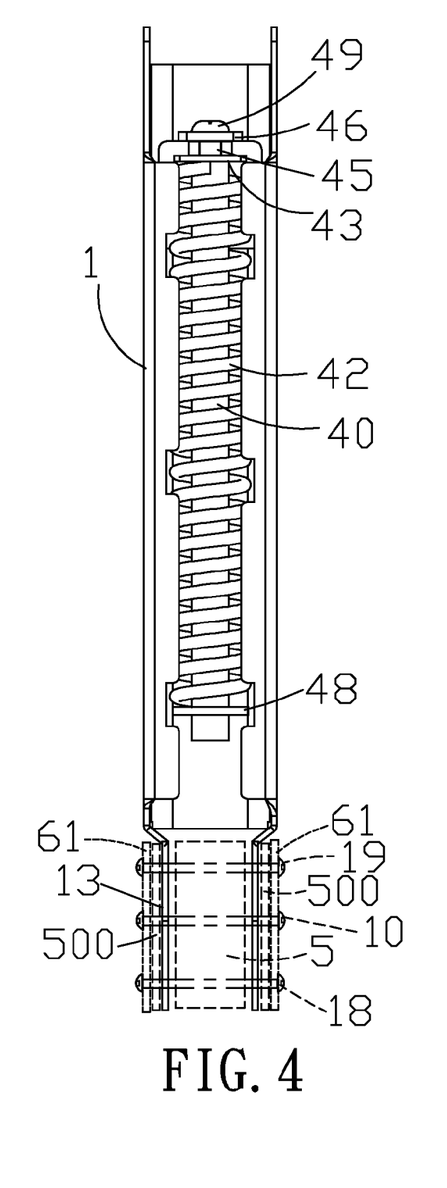
FIG. 4 is a view similar to FIG. 1 where another preferred embodiment of the support arm structure is shown.
Figure 5:
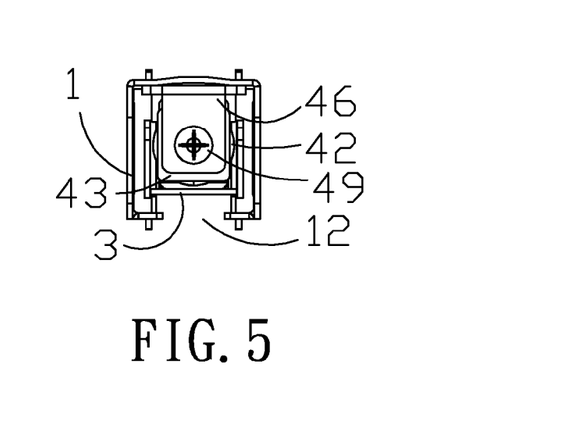
FIG. 5 is a top plan view of FIG. 1 with the seating member removed.
Figure 6:
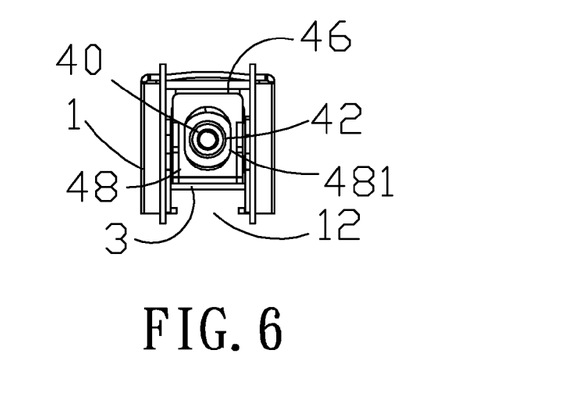
FIG. 6 is a bottom plan view of FIG. 5.

Alternatively, the inner assembly 3 is replaced with two opposite plates 500 each fastened between the lateral yoke 61 and the extension 13 of the same side (see FIG. 4).

Figure 25:
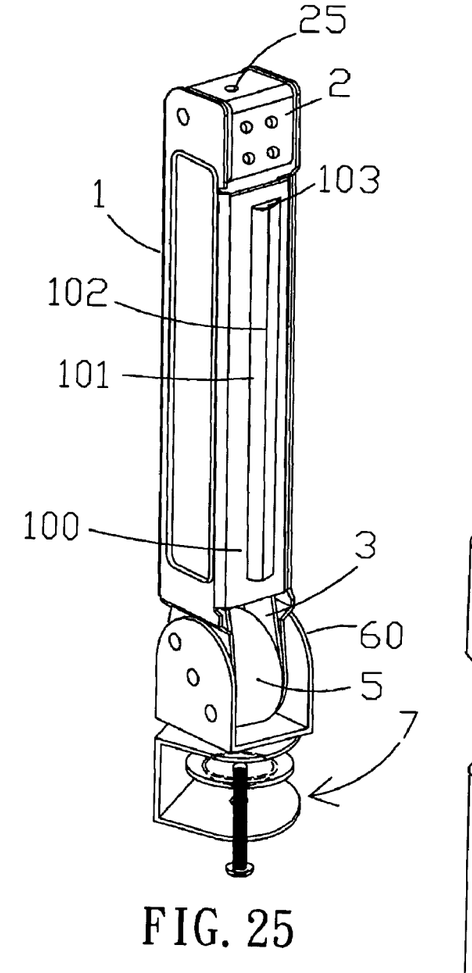
FIG. 25 is a perspective view of the support arm structure directly secured to a clamp which is mounted on an edge of a desk.

Still alternatively as shown in FIG. 25, the seat member 6 and the cylinder 70 are eliminated with the yoke member 60 directly pivotably secured on the top of the clamp 7. Moreover, the outer assembly 1 has a section of rectangle with a raised portion 101 formed on one side surface 100. Further, a longitudinal slit 102 is formed on the raised portion 101 and a longitudinal hole 103 is formed within the raised portion 101.

Figure 26:
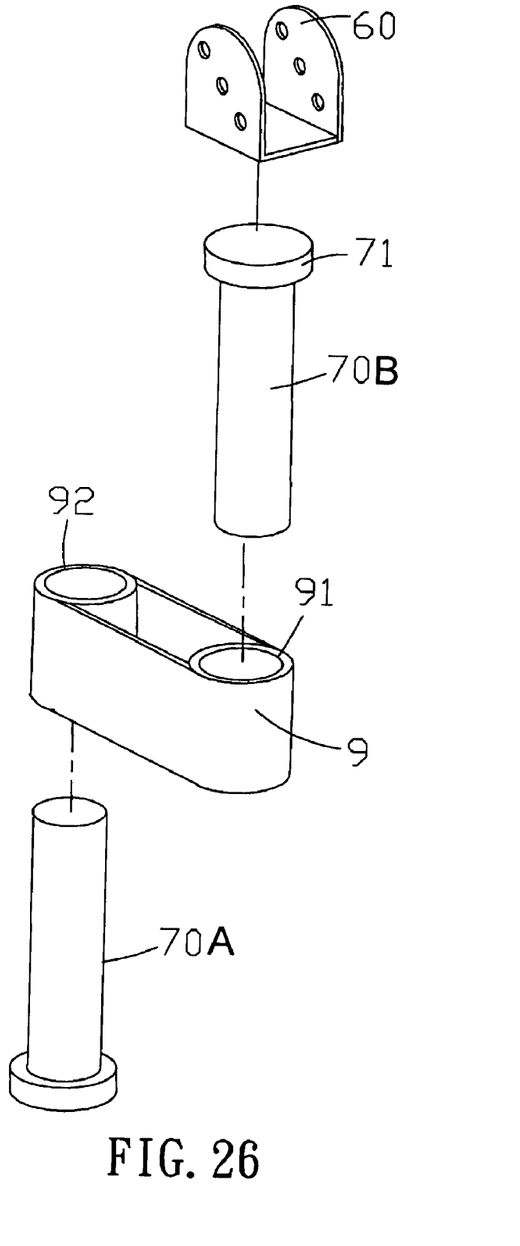
FIG. 26 is an exploded view of two cylinders, a yoke member, and a joint according to still another preferred embodiment of the invention.

Still alternatively as shown in FIG. 26, the seat member 6 is eliminated, an outer cylinder 70B is provided in addition to an inner cylinder 70A, and a joint 9 is provided. The joint 9 has a first sleeve 91 adapted to secure to the inserted outer cylinder 70B and a second sleeve 92 adapted to secure to the inserted inner cylinder 70A. Further, the enlarged head of the outer cylinder 70B is pivotably secured to the yoke member 60.

Figure 27:
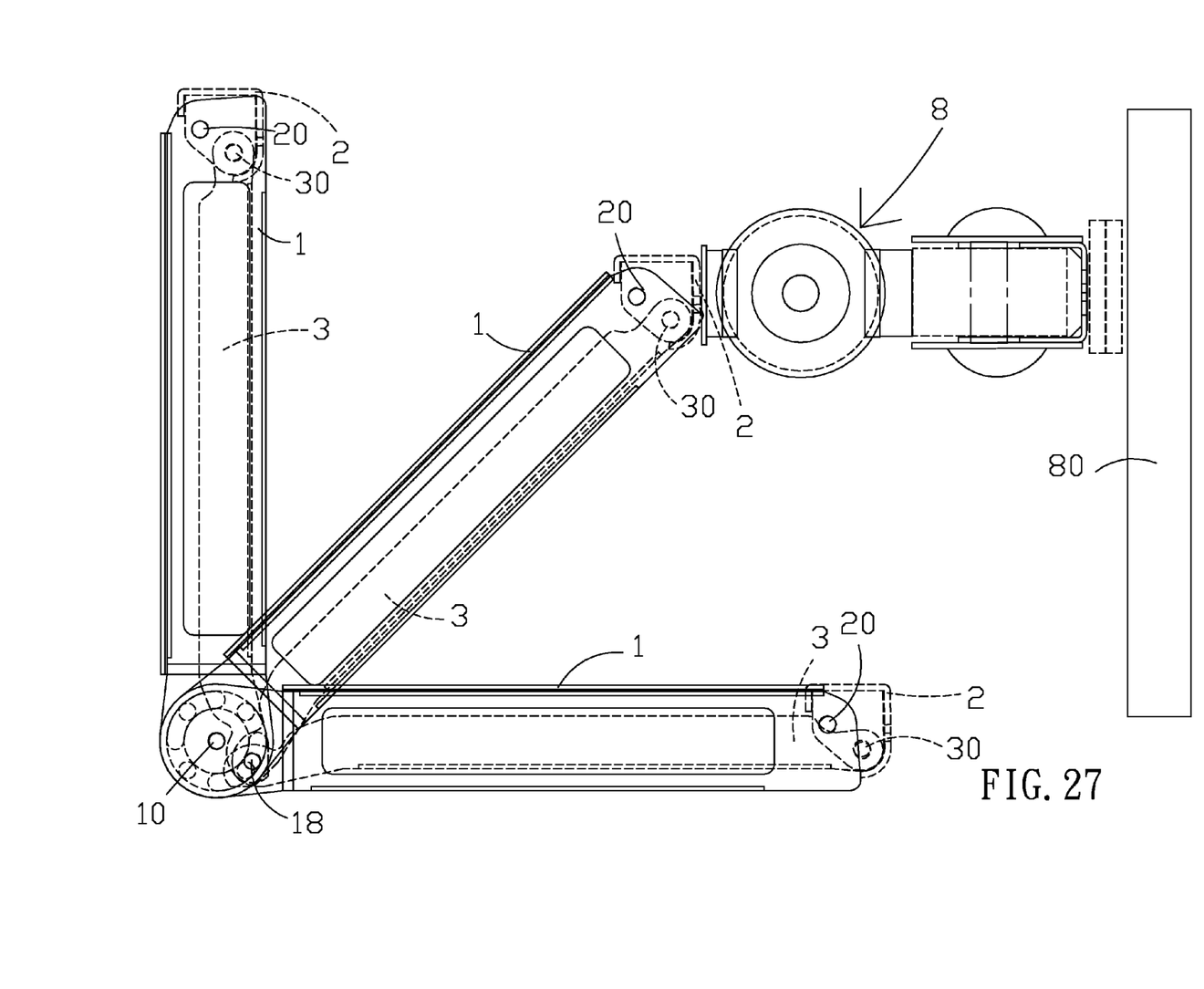
FIG. 27 is a side elevation of the support arm structure of FIG. 1 secured to a mounting assembly which is in turn secured to article to be supported with the support arm structure being adjusted from a vertical or horizontal orientation to an orientation of about 45 degrees.
Figure 28:
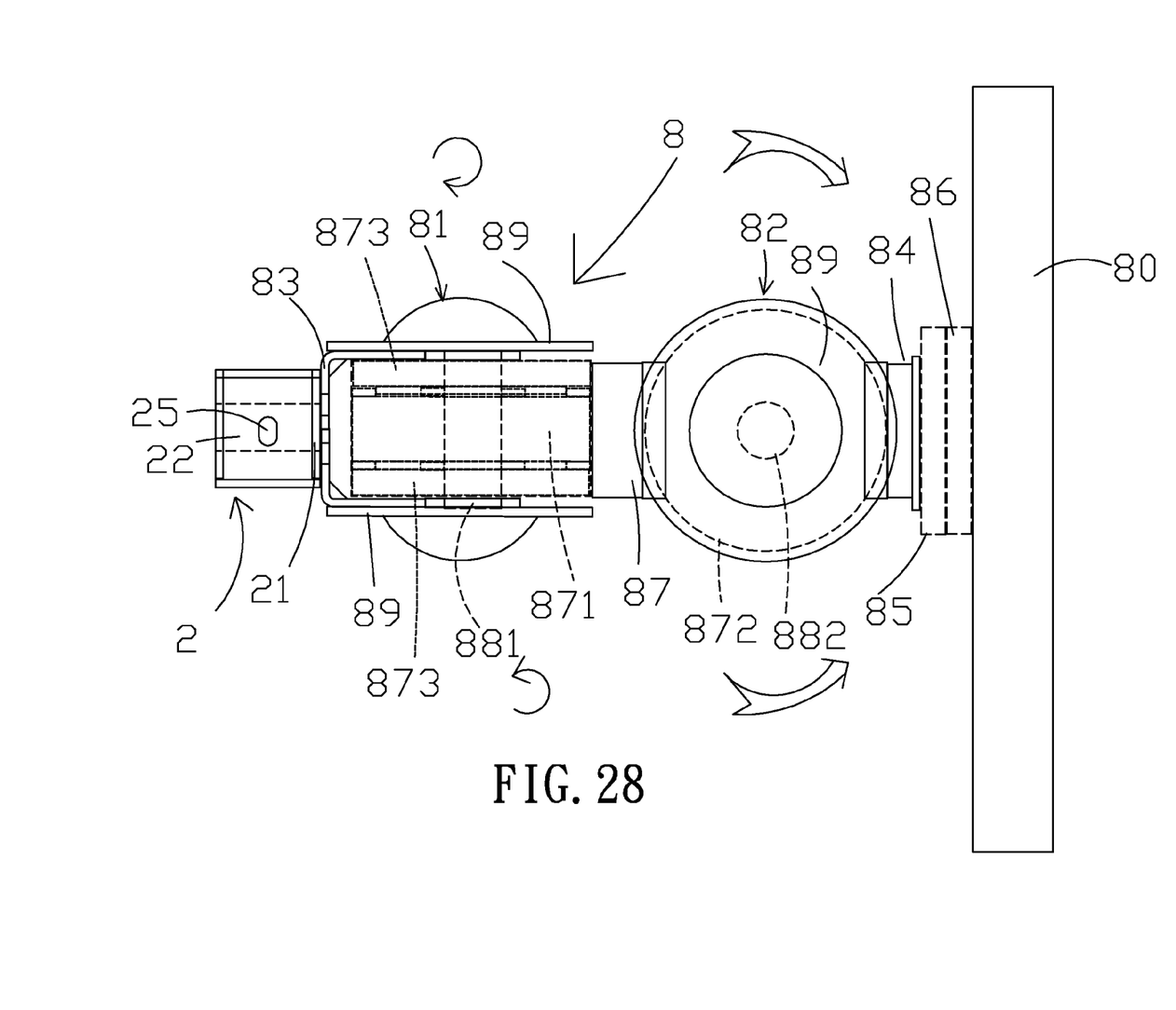
FIG. 28 is a top plan view of the mounting assembly, the article, and the seating member of FIG. 27.
Figure 29:
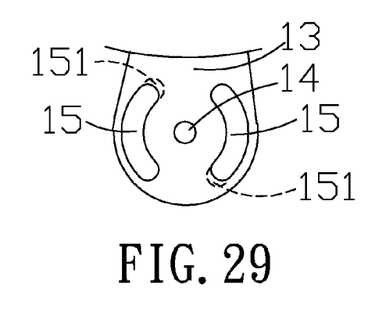
FIG. 29 is a side elevation of the extension of the outer assembly.

Still alternatively as shown in FIGS. 27 and 28, an individual may pivot the outer assembly 1 about the first pivot pin 10 and pivot seating member 2 about the second pivot pin 20 to dispose the outer assembly 1 in any desired orientation such as vertical, 45 degrees, and horizontal as shown in FIG. 27.

A mounting assembly 8 is provided and comprises a first pivotal section 81, a second pivotal section 82, and an interconnection 87. The first pivotal section 81 is adapted to pivot in a direction as indicated by either left arrow in FIG. 28. The first pivotal section 81 comprises a frame 83 threadedly secured to the outer surface 21 of the seating member 2, two opposite first damping members 873 of the interconnection 87 each frictionally secured between a central member 871 of the interconnection 87 and either side of the frame 83, two first cover plates 89 each provided on either side of the frame 83, and a first pivot 881 provided across the frame 83, the first damping members 873, and the central member 871. Hence, the first pivotal section 81 is adapted to pivot about the first pivot 881 as indicated by either left arrow in FIG. 28.

The second pivotal section 82 is adapted to pivot in a direction as indicated by either right arrow in FIG. 28. The second pivotal section 82 comprises first, second and third members 84, 85, 86 in which the third member 86 is adapted to secure to an article (e.g., an LCD display) 80, a second damping member 872 of the interconnection 87 frictionally secured around a second pivot 882, and two second cover plates 89 provided on top and bottom surface of the second damping member 872. Hence, the second pivotal section 82 is adapted to pivot about the second pivot 882 as indicated by either right arrow in FIG. 28.

It is noted that the spring assembly 4 may be configured in an orientation opposing that described above. For example, the upper guide member 46 is provided in the lower portion of the outer assembly 1, the lower guide member 48 is provided in the upper portion of the inner assembly 3, and other associated components are provided accordingly. Thus, the spring force adjustment is done from the lower portion of the spring assembly 4. Moreover, the upper guide member 46 may be provided in the inner assembly 3, the lower guide member 48 may be provided in the outer assembly 1, and the fastening plate 43 is provided accordingly. All of the above are contemplated by the invention.

While the invention herein disclosed has been described by means of specific embodiments, numerous modifications and variations could be made thereto by those skilled in the art without departing from the scope and spirit of the invention set forth in the claims.

What is claimed is:

1. A support arm structure comprising:
an outer assembly (1) comprising a main member (11) of section of U and two opposite bottom extensions (13);
an inner assembly (3) comprising a main section (31) of section of U mounted in the main member (11), two opposite bottom yoke arms (33), and two opposite top yoke arms (35);
a clamp (7) adapted to secure an edge of an object;
a yoke member (60) adapted to turn about the clamp (7);
a pivot pin (10) for pivotably securing both the extensions (13) and the yoke arms (33) to the yoke member (60);
a lower guide member (48) secured to the main section (31) and comprising a top through hole (481);
an upper guide member (46) secured to the outer assembly (1) and disposed in a space defined by the outer assembly (1) and the inner assembly (3), the upper guide member (46) comprising a top through hole (47);
a fastening plate (43) comprising a threaded hole (44);
a tube (40) having a bottom end inserted through the through hole (481) and a top end secured to the fastening plate (43);
a biasing member (42) put on the tube (40) to urge against the lower guide member (48) and the fastening plate (43);
a nut (45) fixedly secured to the upper guide member (46) and aligned with the through hole (47);
a threaded fastener (49) passing the through hole (47) to secure to the nut (45) and the fastening plate (43); and
a seating member (2) pivotably secured to the top of the main member (11) and the top yoke arms (35) and comprising a top hole (25) aligned with the threaded fastener (49);
wherein a tool is adapted to insert into the top hole (25) to turn the threaded fastener (49) either in a first direction to lift the fastening plate (43) and expand the biasing member (42) or in a second direction to lower the fastening plate (43) and compress the biasing member (42).

2. The support arm structure of claim 1, wherein the clamp (7) is aligned with the yoke member (60).

3. The support arm structure of claim 1, wherein the clamp (7) is offset with respect to the yoke member (60).

4. The support arm structure of claim 1, wherein the mounting assembly (8) comprises a first pivotal section (81) secured to the seating member (2) and adapted to pivot about a horizontal axis (881); a second pivotal section (82) adapted to secure to an article (80) and adapted to pivot about a vertical axis (882); and an interconnection (87) interconnecting the first pivotal section (81) and the second pivotal section (82).

* * * * *